Jan. 18, 1966  T. W. MORRISON  3,229,353
METHOD OF MAKING A BEARING RING
Filed Oct. 6, 1964  2 Sheets-Sheet 2

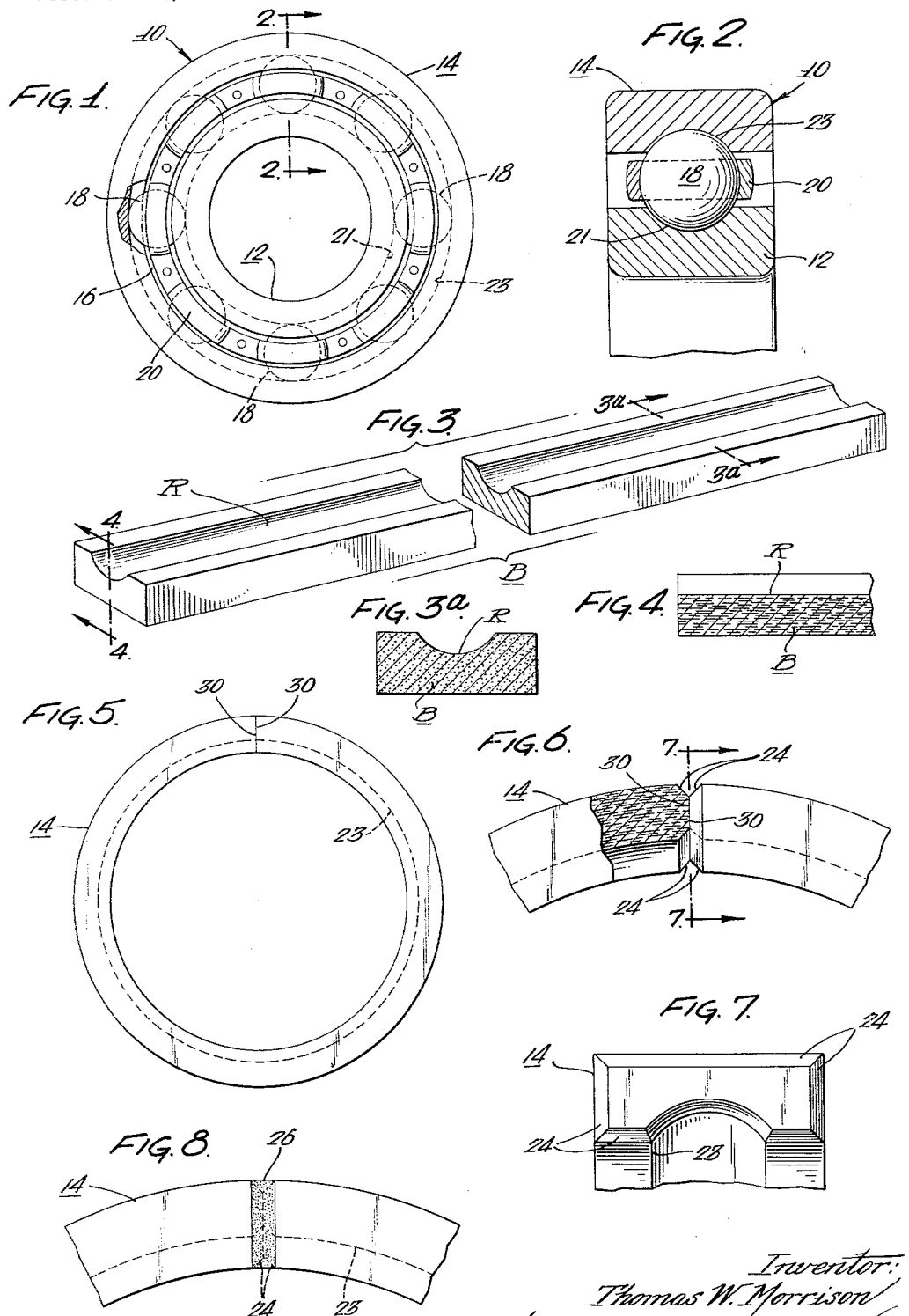

Inventor:
Thomas W. Morrison
by Howson & Howson
Attys.

United States Patent Office 3,229,353
Patented Jan. 18, 1966

3,229,353
METHOD OF MAKING A BEARING RING
Thomas W. Morrison, Rydal, Pa., assignor to SKF Industries, Inc., King of Prussia, Pa., a corporation of Delaware
Filed Oct. 6, 1964, Ser. No. 401,896
5 Claims. (Cl. 29—148.4)

This invention relates to bearing assemblies and more particularly to a new and improved method for making the rings of bearing assemblies and to a rolling bearing assembly made by the present method.

In accordance with one of the known methods for making rings for rolling bearing assemblies, annular blanks are cut from tubular steel or bar stock and thereafter the annular blanks are machined to approximately the finished dimensions of the ring. In the case of rings for ball bearings, the machining also includes forming the annular groove defining the raceway for the balls in one peripheral surface of the ring. Other machining might include formation of grooves for a seal or the like. Thereafter the rings are heat treated and ground to final size. FIGS. 9–12 inclusive of the drawings show the steps of making a ring for a rolling bearing in accordance with this prior art method.

This method for making rings, however, has certain substantial drawbacks. For example, tube material is comparatively expensive and by reason of the machining, there is a comparatively large scrap loss. The machining operation is time consuming and costly. Furthermore, in order to minimize scrap losses resulting from machining or turning the tubes or bars, it may be necessary to maintain a large number of tube sizes in stock, usually one tube size for each size race ring.

Additionally, it is known that bearing assemblies wherein the rings are made from tubular stock in the above manner have a useful life limited by surface fatigue. One factor adversely affecting fatigue life is that the grain flow or fiber direction of the finished ring, especially in the area of the raceway, is not uniform. In other words, in some areas of the raceway, end grain is presented at the ball path and at others, side grain and in still other areas it is somewhere in between. In areas where side grain is presented at the ball path, the grain flow or fiber direction is in the direction of the axis of the tube or bar, i.e., at 90° to the direction of rolling of the balls. Furthermore, it has been found that the fatigue life of the bearing assembly is substantially lower where the grain flow or fiber direction of the material in the roller path is other than in the direction of rolling motion of the balls or rollers.

It has been found that the material at the outer periphery of the stock from which rings are made gives significantly longer contact fatigue life than the material toward the center of the stock for the reason that slag inclusions and impurities tend to collect toward the center of the stock when it is cast. Thus, in making bearing rings from tubes or bar stock by the above method, the raceway is formed by machining away the best material for rolling contact fatigue and the raceway surface material is closer to the center of the stock. Therefore the fatigue life of these bearings is further limited.

The present invention provides a new and improved method for making rings for rolling bearing assemblies whereby the fatigue life of the bearing assembly is greatly increased as compared to bearing assemblies where the rings are made from bas stock or tubing by the conventional machining methods noted above. In accordance with the present invention, the steel for the bearing rings is hot rolled or extruded to the approximate cross sectional size and shape, annealed and then cold drawn through dies to the desired final size and shape. The drawn bar material is then cut to proper lengths and bent to circular shape so that the ends contact each other. The edges of the abutting ends are then chamfered to provide a V-notch around the periphery of the abutting ends. The abutting ends of the ring are then welded accurately so that the softened hot metal flows only into the V-notch around the periphery of the abutting ends of the ring. The rings are next heat treated and finish ground to final size.

The present method for making rings is more economical than prior methods discussed above due to the fact that a step in the manufacture of the ring is eliminated, namely, machining, and also due to the fact that there is less waste material. Additionally, a bearing assembly made in accordance with the present invention has a substantially greater fatigue life. It is noted that in rings made in accordance with the present invention, the relationship of surface and center ingot material is maintained throughout the rolling, extruding and drawing operations, so that the balls or rollers engage surface material; while in the case of those machined from bar stock or tubing, the balls or rollers operate on material some distance from the surface material since the surface material is machined away in the area of the raceway. Hence, bearings made in accordance with the present invention have greater fatigue life. Moreover, the grain structure of the rings made in accordance with the present invention is uniform and in the direction of rolling of the balls or rollers and this also contributes to a longer fatigue life as compared with prior bearing assemblies wherein the grain structure of the raceway is not uniform.

With the foregoing in mind, an object of the present invention is to provide a method for making rings for rolling bearing assemblies whereby the assemblies are characterized by a greater fatigue life.

A further object of the present invention is to provide rolling contact bearing assemblies having improved resistance to fatigue.

Still another object of the present invention is to provide a method for making rings of rolling bearing assemblies which is highly economical.

These and other objects of the present invention and the various features and details thereof are hereinafter more fully set forth with reference to the accompanying drawings, wherein:

FIG. 1 is a side elevational view of a bearing assembly in accordance with the present invention;

FIG. 2 is an enlarged sectional view taken on lines 2—2 of FIG. 1;

FIG. 3 is an enlarged perspective view of an elongated piece of bar stock for making rings for a rolling bearing assembly;

FIG. 3a is an enlarged sectional view taken on lines 3a—3a of FIG. 3;

FIG. 4 is an enlarged fragmentary sectional view taken on lines 4—4 of FIG. 3 showing the grain structure of the bar stock;

FIG. 5 is a side elevational view of the outer ring for a bearing assembly made in accordance with the present invention;

FIG. 6 is an enlarged fragmentary view with parts broken away of a section of the outer ring in an intermediate stage of manufacture;

FIG. 7 is an enlarged sectional view taken on lines 7—7 of FIG. 6;

FIG. 8 is an enlarged fragmentary view of a portion of the ring shown in FIG. 5;

Figure 9:
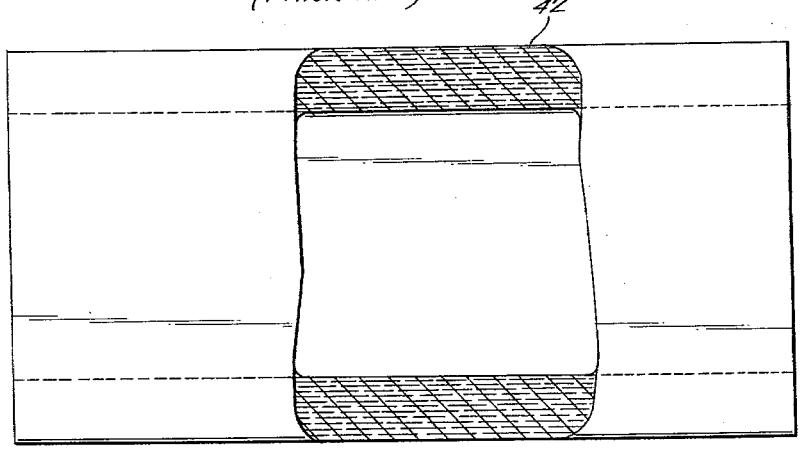
FIG. 9 is a side elevational view with parts broken away of a piece of extruded tubular stock.
Figure 10:
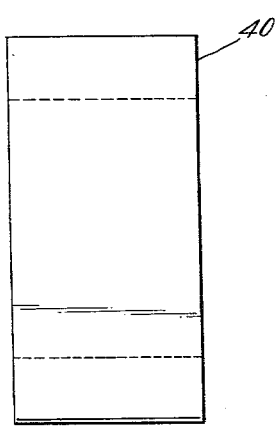
FIG. 10 is a side elevational view of an annular blank cut from the tubular stock shown in FIG. 9.
Figure 11:
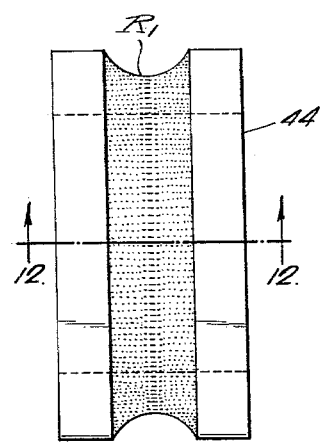
FIG. 11 is a view of a finished ring made from the annular blank shown in FIG. 10.
Figure 12:
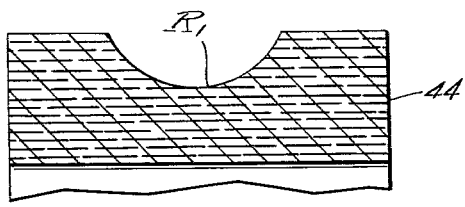
FIG. 12 is an enlarged fragmentary sectional view taken on lines 12—12 of FIG. 11.

Referring now to the drawings, and particularly to FIG. 1 thereof, there is shown a bearing assembly 10 in accordance with the present invention. The bearing assembly 10 comprises inner and outer rings 12 and 14 which are spaced apart to define an annular space 16 therebetween and a plurality of rolling elements, in the present instance balls 18 in the annular space between the rings. The inner and outer rings 12 and 14 are provided with the raceways 21 and 23 respectively on which the balls ride. The bearing assembly further includes a conventional type cage 20 to circumferentially space the balls 18 in the annular space. Even though the present invention is illustrated in connection with a single row, deep groove ball bearing assembly, it is to be understood that the invention applies also to other types of rolling bearing assemblies.

In accordance with a prior art method of making rings for a rolling bearing and with reference to FIGS. 9-12 inclusive of the drawings, annular blanks 40 are cut from an elongated piece of tubular stock 42. The tubular stock 42 may be extruded whereby the grain flow or fiber direction of the material is in an axial direction as illustrated in FIG. 9. The annular blank 40 is then machined to form a raceway $R_1$. Thereafter the ring 44 is heat treated and ground to final size. Thus, the grain flow or fiber direction of the finished ring in the area of the raceway $R_1$ is not uniform. Therefore in some areas of the raceway $R_1$ end grain is presented at the ball path and at others side grain and in still other areas it is somewhere in between. (See FIGS. 11 and 12.) Thus, it has been found that the fatigue life of bearing assemblies wherein rings are made in this manner is substantially lower because of the fact that the grain flow or fiber direction in the area of the raceway is other than in the direction of rolling motion of the balls or rollers. Further it is noted that when the raceway $R_1$ is formed by machining operation, the final surface of the raceway $R_1$ is closer to the center of the stock. As noted previously, slag inclusions and impurities tend to collect toward the center of the stock and thus, the fatigue life of bearing assemblies employing these rings are further limited.

In accordance with the present invention, at least one of the rings, and preferably both rings, may be made from an elongated, flat piece of bar stock B which may be formed for example, by rolling and extrusion to the approximate cross sectional shape of the finished rings, annealed and then cold drawn through suitable dies to approximately the desired final cross sectional size and shape. The bar B is cut into sections one ring being made from each section. In the present instance, one of the sections of a suitable length for an outer ring is bent to a circular shape as illustrated in FIG. 5. The edges of the abutting ends of the bent section of the bar are chamfered as at 24 to receive a weld 26 to hold the abutting ends of the ring together. The ring is then heat treated and ground to the final size.

Considering now in more detail the method for making rings in this manner, the starting material may be an elongated ingot which is hot rolled or hot extruded to provide the bar B which is the approximate cross sectional shape of the ring. In the present instance, in the extruding operation the raceway R of the ring is formed. In other instances, the bar B is then cut into sections of predetermined lengths, depending on the size of the rings desired. These sections are then bent by suitable means to a circular shape so that the terminal ends of each section abut, and the end faces are aligned. In the present instance a section of the bar illustrated in FIG. 5 is the outer ring 14 of the bearing assembly. It is noted that rings having different diameters can be made from the same bar merely by cutting sections of given length and that both inner and outer rings may be made from one bar merely by bending a given section in one direction for an inner ring and in the opposite direction for an outer ring. Thus, from the standpoint of inventory, there is an advantage over the prior method of using tubular stock where a different stock size is necessary for each diameter ring. The peripheral edge of each end face 30 of the bent section of the bar is then V-notched or chamfered. If desired, the edges of the end faces may be chamfered prior to bending to a circular shape. The ends of the bar section are then welded together, for example, by resistance welding. In the welding operation, the softened metal closely approaches, but does not flow beyond, the boundary of the cross section. The welded ring is then heat treated and ground to final size. It is noted that no machining is necessary since the dimensions and form after welding require only a small amount of finish grinding.

This method of making rings for rolling bearing assemblies is extremely economical and results in bearing assemblies which exhibit a greatly increased resistance to fatigue. The assembly is economical for the reason that the machining operation is eliminated which, of course, means that there is less waste material formed during the manufacturing process. Storage of stock material is also greatly reduced. The bearing assembly exhibits a greatly increased resistance to fatigue for the reason that the grain structure of the finished ring in the critical contact area of the raceway is aligned with the direction of rolling of the rolling elements in the raceway. Thus, as contrasted with the prior methods wherein rings were machined from tubular stock or bar stock and where the grain flow or fiber direction was axial, the bearing of the present invention gives a much longer fatigue life because of the more favorable uniform grain orientation of the raceway in relation to the rolling direction of the balls or rollers. Moreover, by the present method, the relationship of the surface and center ingot material is maintained throughout the rolling, extruding and drawing operations and hence, the balls or rollers are operating on surface material exclusively, while in the case of those machined from bar stock or tubing, the balls or rollers operated on material some distance from the surface material due to the fact that surface material is removed during the machining operation. Thus, since the metal representing the surface of an ingot gives significantly longer rolling contact fatigue life than the material toward the center where the slag inclusions and impurities tend to collect during the formation of the ingot, this is also a factor significantly increasing the fatigue life.

While a particular method of making a ring for rolling bearing assemblies has been illustrated and described herein, it is not intended to limit the invention and changes and modifications may be made therein within the scope of the following claims.

I claim:

1. A method of making a ring for a rolling bearing assembly consisting of the steps of hot rolling a piece of steel to form an elongated bar, annealing the bar, cold drawing the bar through a suitable die so that the bar is of cross sectional size and shape of a finished ring, cutting the bar into a plurality of sections, bending each section to a circular shape with the ends thereof in abutting relation and joining the ends to form an integral ring.

2. A method as claimed in claim 1, wherein the ends are joined by welding.

3. A method as claimed in claim 2 wherein the peripheral edge of the end faces of the section are chamfered prior to welding.

4. A method as claimed in claim 2 including the additional steps of heat treating and finish grinding the ring after welding thereof.

5. A method of making a ring for a rolling bearing assembly consisting of the steps of forming from an ingot at least one section of bar stock of a cross sectional size and shape approximately equal to the ring and having formed therein an area providing the raceway for the ring, the forming step including cold drawing of the bar stock, at least the area defining the raceway having a grain direction substantially aligned with the rolling direction of the rolling elements in the raceway, the relationship of said raceway material and the center of the ingot being maintained throughout the forming process and said raceway material being substantially devoid of impurities, bending the section to a circular shape and joining the ends to form an integral ring.

References Cited by the Examiner

UNITED STATES PATENTS

| | | | |
|---|---|---|---|
| 165,386 | 7/1875 | Tracy | 72—272 |
| 1,340,310 | 3/1920 | Wolff | 308—195 |
| 1,682,996 | 9/1928 | Smith | 29—477 |
| 1,747,867 | 2/1930 | Gregovsky | 308—195 |
| 1,967,821 | 7/1934 | Hess | 29—148.4 |
| 1,971,433 | 8/1934 | Tartrais | 29—149.5 |
| 2,719,765 | 10/1955 | Menne | 29—148.4 |
| 2,741,826 | 4/1956 | Hall | 29—148.4 |
| 2,783,528 | 3/1957 | Menne | 29—442 X |
| 2,913,810 | 11/1959 | Heim | 29—148.4 |
| 3,036,365 | 5/1962 | Hanau | 29—148.4 |
| 3,139,666 | 7/1964 | Leciejewski | 29—148.4 |

FOREIGN PATENTS 191,707   9/1957   Austria.

WHITMORE A. WILTZ, *Primary Examiner.*

T. H. EAGER, *Assistant Examiner.*